April 26, 1955  T. HARRIS  2,707,002
HYDRO-PNEUMATIC ACCUMULATOR
Filed Aug. 30, 1952
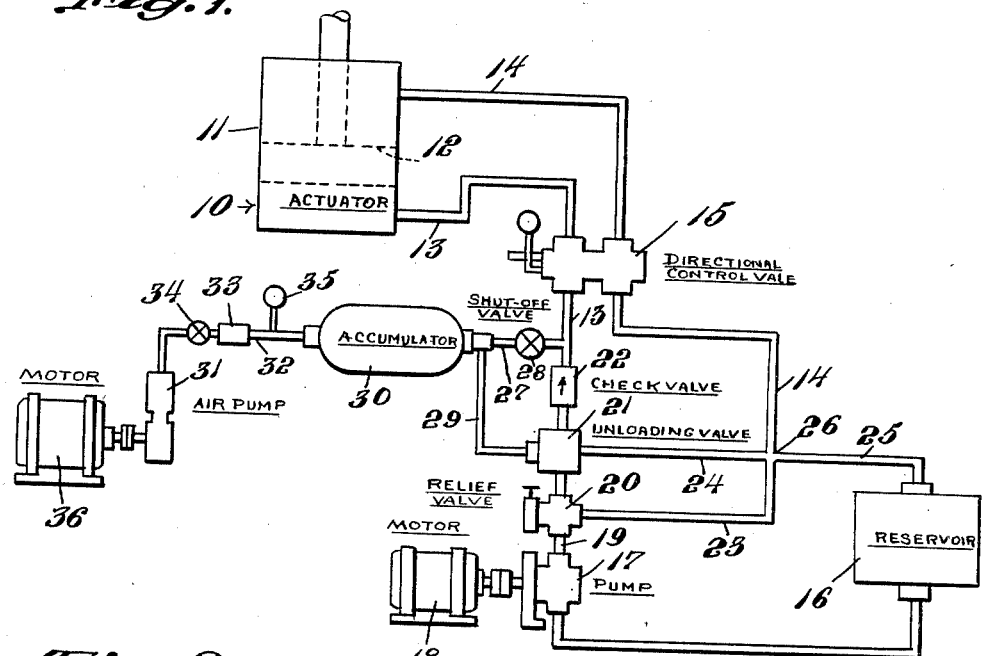
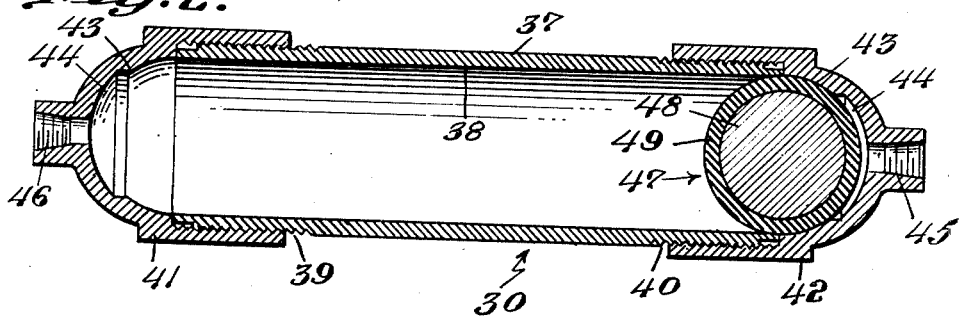
INVENTOR.
Thomas Harris
BY Barlow & Barlow
ATTORNEYS.

United States Patent Office 2,707,002
Patented Apr. 26, 1955

2,707,002
HYDRO-PNEUMATIC ACCUMULATOR

Thomas Harris, Warwick, R. I.

Application August 30, 1952, Serial No. 307,348

1 Claim. (Cl. 138—31)

This application relates to an accumulator more particularly of the type for receiving a liquid in one end to decrease a volume of gas held at the other end and thus increase the gas pressure until a pressure balance is reached.

In hydraulic systems it is usual to use an accumulator to balance the pressures or absorb fluctuations of pressure due to changes in volume. The rubber bag type is frequent and comprises an air inflatable bag in the accumulator which is contacted by the surrounding liquid. In some cases where the fluctuation is small a rubber diaphragm type of accumulator has been used. In this type of accumulator where there is a constant flexing of rubber or some similar material, wear from friction or fatigue from flexure ultimately causes failure, and the liquid and gas become mixed and the device completely inoperative.

One of the objects of this invention is to provide an accumulator of extreme simplicity and inexpensive to manufacture.

Another object of the invention is to provide an accumulator which will have a long-wearing life and consequently one which will not fail because of friction on some certain part or fail from fatigue.

Another object of this invention is to provide a device wherein the moving part will distribute its wear over an extended surface and thus extend the life of the device.

More specifically the arrangement comprises a sphere for separating the liquid and gas, which has a deformable surface which will cause a seal along an elongated cylinder allowing the sphere to move along the cylinder to compensate for the change in volume of the liquid and thus by such movement vary the pressure of the gas in the cylinder. The ball in effect floats, thus rotating and presenting an extended surface throughout its spherical extent to contact the cylinder and wear therewith.

With these and other objects in view, the invention consists of certain novel features of construction as will be more fully described and particularly pointed out in the appended claim.

In the accompanying drawings:

Figure 1 is a diagrammatic view illustrating a system in which the accumulator, which is the subject of this invention, is located; and Figure 2 is a sectional view of the accumulator.

In proceeding with this invention, I provide a hollow cylinder which is closed at its opposite ends, although through such closure at the ends there is permitted an entrance for the liquid at one end and an entrance for gas at the other end. A sphere or ball fits snugly within the cylinder having a surface which is composed of rubber, Neoprene, or like material which is resilient by means of being coated with one of these materials, the sphere being of a diameter when unconfined slightly larger than the diameter of the cylinder but when in the cylinder being slightly deformed so as to firmly engage the walls thereof. As pressure is applied to the ball, it moves to one end or the other against one of the caps and further tends to enlarge diametrically by reason of the pressure applied so as to provide a tight seal between the liquid and the gas. By maintaining air in one end of the cylinder under a desired pressure, this pressure will cause the hydraulic system which communicates with the other end to be under substantially this pressure throughout the entire system.

In Figure 1 there is diagrammaticaly shown a fluid system which comprises an actuator designated generally 10 having a cylinder 11 and piston 12 therein. Conduits 13 and 14 lead to opposite sides of the piston and are controlled through a valve 15 having a dual control for both of these conduits. A reservoir 16 serves to supply pump 17 driven by electric motor 18 which pumps liquid through conduit 19, relief valve 20, unloading valve 21, and check valve 22 to the conduit 13 above mentioned. Conduit 14 is connected to the reservoir as is also the relief and unloading valves by conduits 23 and 24 joining the common conduit 25 as at 26. The accumulator is connected to the system through conduit 27 having a shut-off valve 28 therein and also is connected to the unloading valve by conduit 29, this accumulator being designated generally 30 and shown as connected at its opposite end to an air pump 31 by means of conduit 32 having a check valve 33 therein and shut-off 34. A gauge 35 indicates the pressure in the conduit 32, while a motor 36 serves to operate the air pump until there is shown on the gauge 35 the pressure desired to be maintained in the system.

The accumulator 30, about which this invention centers, comprises a cylindrical body 37 having a uniform internal diameter 38 throughout its extent. It is threaded as at 39 at one end and 40 at the other end on its outer surface to receive caps 41 and 42 which have an internal surface portion 43 which is of a radius substantially the radius of the circular surface 38. A recess 44 is provided in each of these caps from which recess there leads the liquid entrance opening 45 in the cap 42 and the air entrance opening 46 in the cap 41. A sphere 47 has a solid metal core 48 with a wall or covering 49 of some resilient material such as Neoprene or some rubber-like material, which will be resistant to the liquid such as oil which will be used in the system. As the ball is forced against a seat 43, increased pressure tends to move the sphere out of its true spherical position causing a deformation which more tightly binds against the surface of the tubular diameter 38 or the surface 43 of one of the caps against which it is forced.

It is known that the pressure times the volume of the gas is a constant, and accordingly as the volume of the liquid, which is non-compressible, changes to decrease the volume of the gas, the pressure of the gas increases until equilibrium is established. This pressure also will affect the resilient wall of the sphere to cause it to deform and have a tight seal at any position of its extent of movement. The recesses 44 in the caps increase the area over which the pressure acts to cause the same to become more effective upon the sphere in its initial movement from the cap.

In intermittent duty systems an accumulator permits a large saving in horsepower requirements of the power units. A typical example of such saving is demonstrated in the diagrammatic layout shown herein. In systems of this nature where it is desirable to have the pump running continuously, an accumulator unloading valve circuit is to be used. This diagrammatic showing incorporates a pilot operated unloading valve in conjunction with an accumulator. The valve serves two distinct functions: (1) to maintain the required pressure in the system within a set pressure range and (2) to by-pass the fluid delivered from the pump at minimum pressure, circulating it back to the reservoir. When the system pressure attains the higher pressure setting of the unloading valve, the valve opens, allowing fluid to flow at almost zero pressure to the reservoir beyond the valve pressures maintained by the check valve and accumulator. When because of system operations the pressure falls to the lower pressure setting of the unloading valve (generally 10 to 20 per cent of the maximum working pressure), the valve closes and the pump recharges the accumulator. The size of the accumulator determines the time interval between the loading and unloading cycles.

Immediate power is always available in such a circuit. Where multiple operations are to be performed serious pressure losses from the excessive demands on the pump are prevented by the accumulator. This type of circuit greatly reduces the problem of heat so often present in relief valve circuits.

I claim:

A fluid separator comprising a hollow tubular cylinder of substantially uniform internal diameter, closure caps at the opposite ends of the cylinder, means providing a fluid entrance at each end of said hollow cylinder, a sphere between said entrances having an inner rigid core and a separate deformable and resilient outer covering completely enclosing the core with its outer resilient surface normally of a size greater than said internal diameter of said cylinder and held in said cylinder under deformation by displacement of the covering against the inner surface of said cylinder to provide a seal between the sphere and the cylinder surfaces to maintain the fluids entering at the opposite ends separated.

References Cited in the file of this patent

UNITED STATES PATENTS

| | | |
|---|---|---|
| 2,440,065 | Ashton | Apr. 20, 1948 |
| 2,592,613 | Snyder | Apr. 15, 1952 |
| 2,616,453 | Green | Nov. 4, 1952 |

FOREIGN PATENTS

| | | |
|---|---|---|
| 293,032 | Great Britain | Nov. 29, 1928 |
| 399,784 | Great Britain | Apr. 17, 1932 |
| 508,587 | Great Britain | July 4, 1939 |